(12) United States Patent
Marengo et al.

(10) Patent No.: US 8,916,016 B2
(45) Date of Patent: Dec. 23, 2014

(54) MANUFACTURING METHOD FOR COMPONENTS MADE OF FIBER-REINFORCED COMPOSITE MATERIALS BY USING MICROWAVES

(75) Inventors: Giovanni-Antonio Marengo, Isle of Wight (GB); Thomas Mathias Herkner, Munich (DE)

(73) Assignee: GKN Aerospace Services Limited, Isle of Wight (GB)

( * ) Notice: Subject to any disclaimer, the term of this patent is extended or adjusted under 35 U.S.C. 154(b) by 496 days.

(21) Appl. No.: 12/999,921

(22) PCT Filed: Jun. 16, 2009

(86) PCT No.: PCT/EP2009/057493
§ 371 (c)(1),
(2), (4) Date: Apr. 8, 2011

(87) PCT Pub. No.: WO2009/153271
PCT Pub. Date: Dec. 23, 2009

(65) Prior Publication Data
US 2011/0198020 A1 Aug. 18, 2011

(30) Foreign Application Priority Data

Jun. 18, 2008 (DE) .......................... 10 2008 029 056

(51) Int. Cl.
*B29C 65/14* (2006.01)
*B29C 35/02* (2006.01)
(Continued)

(52) U.S. Cl.
CPC ......... *B29C 65/1425* (2013.01); *B29C 65/1477* (2013.01); *B29K 2105/243* (2013.01); *B29C 35/0266* (2013.01); *B29C 35/0805* (2013.01);
(Continued)

(58) Field of Classification Search
None
See application file for complete search history.

(56) References Cited

U.S. PATENT DOCUMENTS 3,749,621 A * 7/1973 Shoffner .......................... 156/86
5,487,853 A * 1/1996 Buckley ........................ 264/496
(Continued)

FOREIGN PATENT DOCUMENTS

DE 36 28 958 A1 3/1988
FR 2 818 577 A1 6/2002
(Continued)

OTHER PUBLICATIONS

PCT International Search Report for PCT/EP2009/057493 dated Sep. 17, 2009.
(Continued)

*Primary Examiner* — Barbara J Musser
(74) *Attorney, Agent, or Firm* — Quarles & Brady LLP

(57) ABSTRACT

A method for manufacturing a component comprising at least one layer having a fiber-reinforced composite material that absorbs microwaves is disclosed. The method comprises at least the following steps: a) arranging the at least one layer in a shape, b) treating a first surface section of the at least one layer with microwaves, wherein a temperature limiting mechanism of the at least one layer cooperate with at least one adjacent second surface section, at least part of the time. The method may be carried out in such that steps a) and b) are carried out for a plurality of components and that the components are further treated according to at least the following steps: c) positioning a plurality of components with respect to one another such that each second surface section forms at least one overlapping area at least partially, d) treating the at least one overlapping area with microwaves.

13 Claims, 2 Drawing Sheets

(51) Int. Cl.
  B29C 35/08 (2006.01)
  B29C 65/00 (2006.01)
  B29C 70/30 (2006.01)
  B29K 105/24 (2006.01)
  B29K 105/06 (2006.01)
  B29K 307/00 (2006.01)
  B29L 31/30 (2006.01)

(52) U.S. Cl.
  CPC ............ B29C 66/1122 (2013.01); B29C 66/43 (2013.01); B29C 66/721 (2013.01); B29C 66/7375 (2013.01); B29C 70/30 (2013.01); B29C 2035/0855 (2013.01); B29K 2105/06 (2013.01); B29K 2105/24 (2013.01); B29K 2105/246 (2013.01); B29K 2307/00 (2013.01); B29L 2031/3082 (2013.01); Y02T 50/433 (2013.01); B29C 65/1496 (2013.01); Y02T 50/43 (2013.01)
  USPC ..................................... 156/275.1; 156/308.4

(56) References Cited

U.S. PATENT DOCUMENTS 6,989,070 B2 * 1/2006 Sakai et al. ............... 156/272.8

2005/0183816 A1 8/2005 Ilzhoefer et al.
2010/0166988 A1 7/2010 Defoort et al.
2010/0289188 A1 11/2010 Graeber et al.

FOREIGN PATENT DOCUMENTS

| GB | 599 555 A | 3/1948 |
| JP | S5712285 A | 1/1982 |
| JP | S58215315 A | 12/1983 |
| JP | H02006107 A | 1/1990 |
| JP | H02273224 A | 11/1990 |
| JP | H11324243 A | 11/1999 |
| JP | 2004016415 A | 1/2004 |
| WO | WO-0062717 A1 | 10/2000 |

OTHER PUBLICATIONS

He Dong-Xiao, Review of the Application of Advanced Composite in Aviation and Aerospace, Hi-Tech Fiber & Application, 2006, vol. 31, No. 2, 4 pages [English Abstract Included].

State Intellectual Property Office, P.R. China, First Office Action, Application No. 200980124359.7, Mar. 1, 2013, 9 pages.

Japanese Patent Office, Notification of Reasons for Rejection, Application No. 2011-515311, Jan. 28, 2014, 6 pages.

* cited by examiner

MANUFACTURING METHOD FOR COMPONENTS MADE OF FIBER-REINFORCED COMPOSITE MATERIALS BY USING MICROWAVES

CROSS-REFERENCE TO RELATED APPLICATIONS

This application is a National Phase of International Application No. PCT/EP2009/057493, filed on Jun. 16, 2009, which claims priority to German Application No. 10 2008 029 056.0 filed on Jun. 18, 2008, which applications are hereby incorporated by reference in there entirety.

TECHNICAL FIELD

The present disclosure relates to a method for producing a structural part having at least one layer comprising fiber-reinforced composite material which absorbs microwaves. The disclosed method may be used for the production of structural components of a fuselage and/or of an outer flow surface of an airplane.

BACKGROUND

With respect to the efforts which are being made to provide airplanes which conform to future ecological requirements and are inexpensive to produce and operate, and to nevertheless meet the strictest safety requirements, possible ways are increasingly being sought to produce the essential primary structures (e.g. wings, fuselage components, housing for the drive units, etc.) using fiber-reinforced composite material rather than aluminum. This lightweight construction technique makes it possible, in particular, to considerably reduce the weight of the airplanes. During the production of such essential primary structures, it must be taken into account that these take on a considerable scale; by way of example, the landing flaps are structural parts which extend over a number of meters. These structural parts are additionally exposed to high levels of stress during operation and therefore represent safety-critical structural parts, for which special quality requirements have to be observed.

Fiber-reinforced composite materials of this type generally comprise two essential components, namely firstly the fibers and secondly a polymer matrix which surrounds the fibers. The matrix encompasses the fibers and is cured by a thermal treatment (polymerization), such that three-dimensional cross-linking takes place. This polymerization has the effect that the fibers are bonded firmly to one another and therefore forces can be introduced into the fibers, namely predominantly via shear stresses. Suitable fibers are both carbon fibers and possibly also glass fibers. Carbon fibers, which nowadays are still relatively expensive, regularly consist of carbon to an extent of at least 90% by weight. The diameter of the fibers is, for example, 4.5 to 8 µm (micrometer). Carbon fibers of this type have anisotropic properties. By contrast, glass fibers have an amorphous structure and isotropic properties. They predominantly comprise silicon oxide, it being possible for further oxides to be admixed if appropriate. Whereas the glass fibers are relatively inexpensive, the carbon fibers are noted for their high strength and rigidity.

Particularly in the construction of airplanes, what is known as pre-preg technology is employed. In this technology, for example, pre-impregnated fabrics or other fiber forms (preform) are soaked in synthetic resins and thermally treated merely until they solidify slightly (gel formation), such that they can be handled in layers. A pre-preg material of this type exhibits a small degree of adhesion and can therefore be arranged readily in appropriate molding tools or one on top of another in layers, until the desired form of the structural part is formed. When the desired layers of the pre-preg material are arranged, they can be (thermally) cured. In order to cure said pre-preg structural parts, use is presently made of what are known as autoclaves, i.e. ovens which may have to be heated with an overpressure (up to 10 bar) over many hours in order to achieve complete curing of the structural parts.

In addition, DE 10 2005 050 528 A1, the contents of which are incorporated by reference, discloses a microwave autoclave, with which the production of fiber composite structural parts by microwave radiation is proposed. The apparatus proposed in said document makes it possible to couple microwave radiation into the pressure chamber of the autoclave. The excitation of the pre-preg materials with microwaves has the advantage that it is not necessary to heat the air located in the autoclave or the inert gas located therein, which is present in a considerable volume owing to the size of the structural parts. The use of microwave technology makes it possible to heat the material to be cured itself directly, and the rest of the surrounding region accordingly remains relatively cold. When heating the pre-preg material using microwaves, the following active mechanisms may set in depending on the material used: dielectric heating and resistive heating. Long-chain hydrocarbon molecules (such as e.g. in epoxy resin) are dipoles (i.e. have an irregular charge distribution) and are excited to oscillate at a high frequency in the electromagnetic field produced by the microwaves. This kinetic energy of the dipoles is then converted by internal friction into heat, which is produced directly in the material (dielectric heating). In addition, it is also possible for eddy currents to arise as a result of induction, and therefore the electrical resistance of the material finally causes an increase in temperature (resistive heating). By way of example, the material can thus be heated to temperatures above 130° C. or even above 160° C., a temperature at which the polymerization or curing of the pre-preg materials regularly begins.

The microwave resonator described in DE 103 29 411 A1, the contents of which are incorporated by reference, is likewise suitable for carrying out such a thermal treatment. Said microwave resonator is generally operated without an overpressure. However, it may also be integrated, if appropriate, in a pressure vessel (autoclave).

A problem which arises during the curing process for such large structural parts, as are used in the construction of airplanes, is that possibly more complex geometries of the components require additional processes for joining such fiber-reinforced composite materials. For this purpose, it was customary to bond cured structural parts to one another by joining using a bonding agent. For this purpose, the surfaces of the cured structural parts were treated, if appropriate, for example ground and/or cleaned. Then, an adhesion promoter was applied, under certain circumstances, to the treated surfaces. This was followed by the application of an adhesive, with which the structural parts to be bonded to one another were then fixed. It is not just the case that this process necessitates relatively laborious handling of the large structural parts; in addition, the pretreatment of the structural parts and also the joining process itself have to be carried out very precisely because here faults repeatedly lead to weakening of the structural parts, which should not be accepted particularly in the construction of airplanes.

SUMMARY

A process is proposed herein with which structural parts, such as structural parts of airplanes, for example, can be produced at low cost, in a variable manner and with uniform properties of the structural parts over the entire cross section.

More specifically, a method having the features of patent claim 1 is proposed. Further advantageous refinements and fields of use are indicated in the dependent patent claims. It should be noted that the features indicated in the dependent patent claims can be combined with one another as desired in a technologically meaningful manner and demonstrate further refinements of the disclosure. The description, in particular in conjunction with the figures, cites further embodiment variants of the disclosure.

An exemplary method according to the disclosure for producing a structural part having at least one layer comprising fiber-reinforced composite material which adsorbs microwaves comprises at least the following steps:

a) arranging the at least one layer in a shape; and
b) treating a first surface portion of the at least one layer with microwaves, wherein a temperature limiting mechanism of the at least one layer interacts at least temporarily with at least one adjacent second surface portion.

The fiber-reinforced composite materials used here can absorb microwaves. In particular, this means that they can be heated with microbeams, i.e. are suitable for dielectric and/or resistive heating.

The fiber-reinforced composite material is, in particular, a carbon-fiber-reinforced composite material. In one exemplary arrangement, the carbon fibers are in the form of long fibers which are endless in the initial state and are arranged in the structural parts in layers, with a different orientation of the longitudinal direction of the fibers. One of the following, in particular, is suitable as resin: epoxy resin, phenolic resin, bismaleimide resin or polyester resin.

In order to produce the structural part, it is possible for one such layer to be used; however, it is also possible to position a plurality of such layers one on top of another at least in certain regions, in order to be able to generate, if appropriate, variable thicknesses of the structural part. Here, a "layer" represents in particular a ply of a pre-preg material.

According to step a), the layers are arranged in the desired shape. If the structural part is planar, said layers are to be arranged, if appropriate, in a planar shape. If a curved shape is desired, the layers are to be arranged and fixed appropriately. Therefore, the shape in which the layers are arranged in step a) substantially affects, in particular, the ultimate form of the desired structural part.

In step b), a locally limited treatment of a first surface portion with microwaves is proposed. For this purpose, it is possible for the entire structural part to be irradiated with microwaves, although it is also possible, if appropriate, for a concentrated microwave treatment to be carried out in the region of the first surface portion or the proximity. In particular, in this case temperatures above at least 80° C., at least 130° C. or even above 160° C. are to be reached by the heating referred to, in order to reliably bring about polymerization of the composite material.

A temperature limiting mechanism of the at least one layer is provided adjacent to said first surface portion. This mechanism may be active throughout the microwave treatment, although this is not absolutely necessary. This temperature limited mechanism interacts with the adjacent second surface portion in such a manner that a temperature of 50° C. is not exceeded there.

This ultimately has the effect that, after step b) has been carried out, a considerably higher degree of cross-linking with respect to the fiber-reinforced composite material can be determined in the region of the first surface portion than in the second surface portion. The degree of cross-linking is a parameter which describes the volumetric proportions of the non-polymerized material components with respect to the fully polymerized material components in the portion of the composite material under consideration.

Whereas, for example, a (first) degree of cross-linking of at least 80% is therefore present on average in the first surface portion, a (second) degree of cross-linking of at most 20% or even at most 10% or even at most 4% is present in the region of the second surface portion.

In this respect, in one specific, but exemplary configuration, the first degree of cross-linking in the region of the first surface portion and the second degree of cross-linking in the region of the second surface portion are achieved in a very narrow transition region, for example in a transition region of at most 30 mm or even at most 10 mm or even at most 5 mm. Essential properties of the first surface portion after the first treatment according to step b) are sufficient strength and cross-linking for further handling and treatment of the structural part. This achievable cross-linking can be derived or determined from the respective matrix type, the type of the semi-finished fiber product, the orientation thereof and the thickness of the layer or structural part. The first surface portion treated according to b) should be conditioned in such a manner that further processing is at least partially possible, as in the case of a conventionally produced structural part.

As a result, in one exemplary configuration, it is therefore preferable for a structural part to be present which is substantially cured in the region of the first surface portion, whereas the structural part is still formable or can be cured further by microwaves in the adjacent second surface portion. The final degree of polymerization or degree of cross-linking can also be achieved, after the treatment described here, via known, conventional curing methods, e.g. autoclave or a forced-air oven. This applies to all regions of a structural part, irrespective of the degree of polymerization reached at each point.

Merely for the sake of completeness, it should also be noted that, after step b) has been carried out, a plurality of second surface portions (which are not (fully) cured) may be present. It is also clear that it is considered, with reference to the surface portions, that the microwaves act from one side of the structural part but can penetrate into the composite material to such an extent that the degrees of cross-linking are present equally over the entire thickness of the structural part or the at least one layer.

It should also be noted that the microwaves can simply be introduced via air or another gas, and therefore it is not necessary, in particular, to provide any liquid carrier media (e.g. water) around the structural part.

For specifically predeterminable second surface portions, the method described here therefore limits the action of the microwaves in such a manner that no curing or no polymerization (to a considerable extent) takes place. After step b), this second surface portion can therefore be subjected to further thermal treatment, such that the degree of cross-linking in the second surface portion changes.

According to a further exemplary embodiment of the method, it is proposed that, in step b), at least one heat-dissipating element is brought into contact with the second surface portion as the temperature limiting mechanism. By way of example, a heat-dissipating element of this type comprises a (plate-shaped) heat-dissipating element made of aluminum or a material having similarly good heat conduction properties. By way of example, a heat-dissipating element of this type can be positioned (directly) in touching contact with the second surface portion. The task of the heat-dissipating element is, in particular, to reduce or to limit the conduction of heat from the first surface portion toward the second surface portion. For this purpose, the heat-dissipating element can also be provided as a cooling unit, i.e. can itself have (active) cooling. The cooling may be controllable and/or may be available permanently.

Furthermore, it is also proposed that, in step b), at least one cooling fluid is brought into contact with the second surface portion as the temperature limiting mechanism. In this context, in one specific exemplary configuration, it is particularly preferred that a gas and/or a liquid is brought into contact directly and/or indirectly with the second surface portions at a temperature considerably below 100° C., in particular below 40° C. and, if appropriate, even below 20° C. In one exemplary configuration it is very particularly preferred that cold air is brought into contact with the second surface portion. The cooling fluid also has the function of dissipating the heat produced, if appropriate, in the region of the second surface portion, and therefore of preventing or limiting cross-linking of the fiber-reinforced composite material.

According to a further embodiment of the method according to the disclosure, it is proposed that, in step b), at least one microwave shield is positioned on the second surface portion as the temperature limiting mechanism. A microwave shield of this type can be provided, in particular, with a plate-shaped element impervious to microwaves. Metallic films or films on which metal has been vapor-deposited, which reflect microwave rays, are preferred as a flexible support in the case of appropriate designs, if no surface molds providing shaping on both sides are provided. Metallic fabric or knitwear (e.g. meshes) is also suitable for use during treatment in step b) with simultaneous venting of the structural part in the second surface portion, where the specific design (e.g. mesh width) has to be matched to the microwave frequency used in order to achieve the required shielding.

Since the microwave shield is positioned between the microwave sources and the second surface portion, the microwave radiation cannot reach the second surface portion and therefore cannot lead to an increase in temperature and polymerization there. The polymerization, too, is prevented by that to the desired extent. If appropriate, a microwave shield of this type can also be brought directly into contact with the second surface portion, so that the latter additionally acts as a heat-dissipating element.

According to a further embodiment of the method, steps a) and b) are carried out on a plurality of structural parts and the structural parts are further treated according to at least the following steps:

c) positioning a plurality of structural parts with respect to one another in such a manner that in each case second surface portions at least partially form at least one overlapping region, d) treating the at least one overlapping region with microwaves.

This method relates, in particular, to the joining of a plurality of such partially cured structural parts or such partially cured structural parts with untreated structural parts or layers. Here, in step c), the structural parts are oriented with respect to one another or positioned one on top of another in such a manner that the second surface portions bear (directly) against one another. In particular, here it is possible to dispense with the usually required preparation of the surface portions or the application of an additional adhesive. Since the second surface portions then bear against one another, the structural parts can be treated again by microwaves. If appropriate, it is expedient in energy terms to treat only the overlapping region in a targeted manner with microwaves, although this is not absolutely necessary, such that even first surface portions which are already cured can be treated or the degree of cross-linking can be raised again there. As a result, however, it is thereby possible to produce a component, from a plurality of structural parts, which has the same degree of cross-linking in all cross sections, where it is possible, in particular, to ensure homogeneous material properties even in the case of complex mold geometries.

In this context, it is also considered to be advantageous that at least one of the structural parts is deformed in the region of a second surface portion at least between steps b) and c) or during step c). The deformation leads, in particular, to a different shape of the structural part. By way of example, this makes it possible for the structural parts to be produced initially in a specific shape and then to be adapted for the specific structural part. It is thereby possible to considerably reduce the production costs specifically for carrying out steps a) and b). In one exemplary configuration, it is preferred that the deformation takes place during step c), where the structural parts are fixed with respect to one another, if appropriate, by appropriate mounts. In any case, this deformation also has the effect that the overlapping second surface portions are in contact reliably and oriented with respect to one another.

Moreover, it is also considered to be advantageous that, in step d), a direct integral bond of the plurality of structural parts is formed in the overlapping region. In other words, this means in particular that no material transitions, differences in strength and/or significant differences in the degree of cross-linking can be identified in the region of the integral bond after step d).

With very particular preference, the method proposed here may be used for producing a component of a fuselage or of an outer flow surface of an airplane comprising such a structural part. The component concerns, for example, a component from the following group: landing flap, flap track beam, nose parts, rudder unit, elevator unit, spoiler, roof elements, nozzle housing, side arm, structural frame. It should be noted that the "airplane" is indicated here only as an exemplary use; other fields of application also exist for other aircraft, e.g. helicopters.

The effect of the method described herein will be demonstrated on the basis of the following example:

Initial Situation:

| | |
|---|---|
| Pre-preg material: | Unidirectional 12K HTS carbon fiber pre-preg with an epoxy resin matrix and a weight per unit area of 145 g/m$^2$ with a resin content of 35% |
| Layer thickness: | 0.145 mm |
| Number of layers: | 16 |
| Other films: | Peel ply, release film, venting nonwoven, vacuum film |
| Temperature before the start: | 25° C. |

Step b):

| | |
|---|---|
| Temperature limiting mechanism: | Aluminum plate |
| Positioning: | Overlaps half the pre-preg plate |
| Cooling fluid: | Compressed air |
| Microwave frequency: | 2.45 GHz |
| Microwave power: | about 10 kW |
| Treatment duration: | about 3 hours 45 minutes |
| Temperature in the first surface portion: | 135° C. |
| Temperature in the second surface portion: | 42° C. |

Result:

| First degree of cross-linking: | above 80% |
|---|---|
| Second degree of cross-linking: | below 20% |
| Transition region: | less than 18 mm |

BRIEF DESCRIPTION OF THE DRAWINGS

The disclosure and also the technical context are explained in more detail below with reference to the figures. It should be noted that the figures show exemplary embodiment variants of the disclosure, although the disclosure is not restricted thereto. It is schematically shown in.

DETAILED DESCRIPTION

Figure 1:
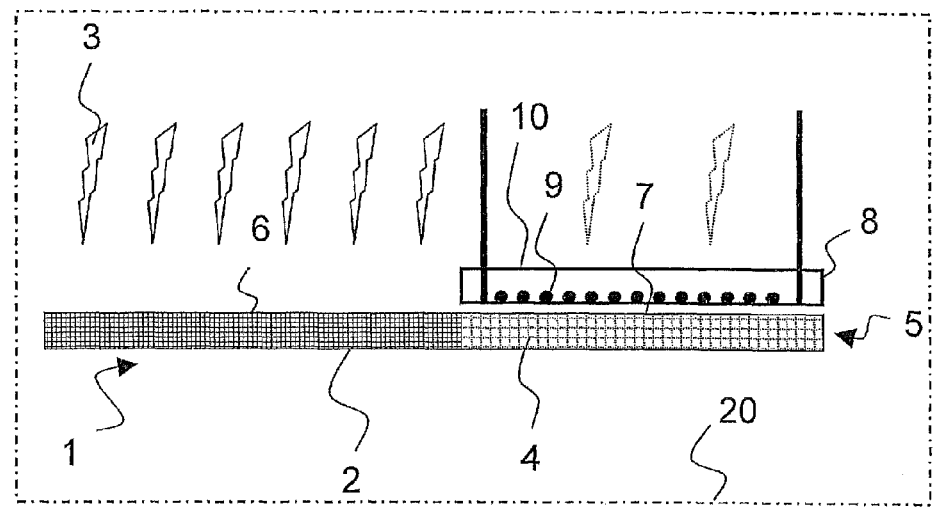
FIG. 1: a structure for carrying out the method according to the disclosure.

FIG. 1 schematically shows an apparatus 20 for carrying out the method described according to the disclosure. By way of example, the apparatus 20 may be a conventional autoclave formed with a plurality of microwave heating sources which comprise microwave sources. By way of example, said microwave sources radiate microwaves at a frequency in the range of 30 megahertz to 30 gigahertz; by way of example, typical frequencies are 0.913 or 2.45 or 5.8 gigahertz. In particular, the frequency of 2.45 gigahertz can be provided at low cost with magnetrons according to the current prior art, where the microwave power is suitable particularly for coupling the energies into the matrix of fiber composite materials. In principle, the apparatus 20 can also operate at increased ambient pressure.

Shown centrally in FIG. 1 is a first structural part 1, which is produced from an individual first layer 2 of composite material 4 and has a planar shape 5. In this case, this is in particular what is known as a pre-preg material, in which carbon fibers are present in an epoxy resin matrix.

The first structural part 1 has a first surface portion 6 and a second surface portion 7, which are arranged adjacent to one another. In the illustration of FIG. 1, the microwaves 3 will act from above on the first structural part 1, and therefore a heat-dissipating element 8 is also provided above the second surface portion 7 (if appropriate also underneath). The heat-dissipating element 8 additionally has a cooling system, with which cooling fluid 9 can be conducted toward the second surface portion 7. In addition, the heat-dissipating element 8 has the effect, for example like an aluminum plate, that the microwaves 3 cannot reach the second surface portion 7, i.e. it additionally acts like a microwave shield 10. As the first structural part 1 is being treated with microwaves 3, the first surface portion 6 cures to a desired degree of cross-linking. The second surface portion 7, which is arranged adjacent thereto, does not reach this degree of cross-linking owing to the measures described above, but instead remains virtually without an increase in the degree of cross-linking.

It should be noted that, specifically if the apparatus 20 is operated under pressure, the first structural part 1 can be surrounded with film or with microlayers which, for example, should ensure demoldability from a structural part mount (not shown here). Microlayers of this type concern, for example, vacuum films (vacuum film), thermal insulations, release films and the like. Here, the vacuum film represents the outer surrounding cladding for the first structural part 1, such that a corresponding use of the method disclosed herein for such a structure should also be included and does not depart from the subject matter of the disclosure.

Figure 2:
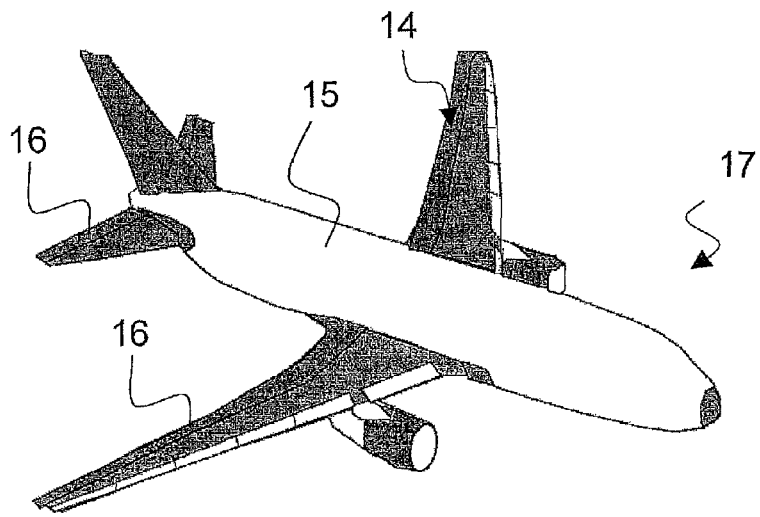
FIG. 2: an airplane.
Figure 3:
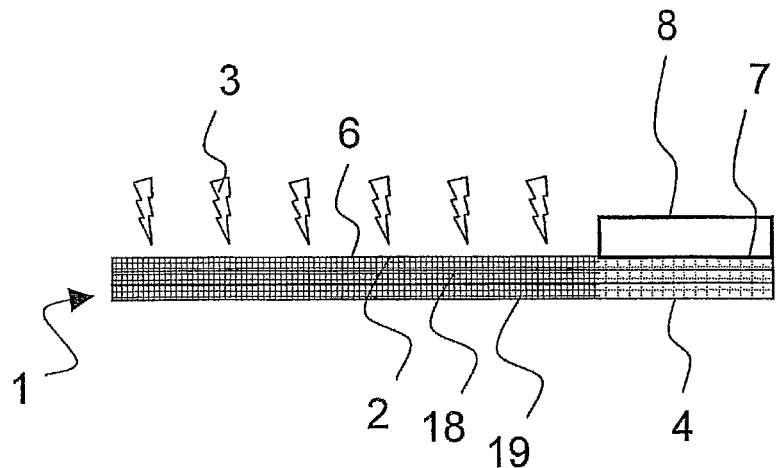
FIGS. 3 to 6: individual method steps according to an embodiment variant of the method according to the disclosure.

FIG. 2 shows, once, components 14 of a fuselage or of a flow surface 16 of an airplane 17, which can be produced using structural parts by the method described herein. It can be seen that even primary structural parts of the structure of an airplane 17 which have a large surface area can be produced by the proposed method, it equally being possible to reduce the weight of the airplane 17 considerably. The relatively low consumption of fuel and/or the relatively high payload associated therewith are some of the advantages of the disclosure.

FIGS. 3 to 6 show different steps of an embodiment variant of the method according to the disclosure. FIG. 3 again schematically shows a first structural part 1, but in this case it has a multi-layer form, i.e. has a first layer 2, a second layer 18 and a third layer 19. Here, the layers can represent various and/or identical plies of a pre-preg material. In this case, too, irradiation of the microwave-adsorbing, fiber-reinforced composite material 4 with microwaves 3 for curing the first surface portion 6 is proposed. A heat-dissipating element 8 is in direct contact in the region of the (smaller) second surface portion 7, and therefore heat produced there is removed, if appropriate, from the first structural part 1 and a curing process is thereby limited or prevented.

Figure 4:
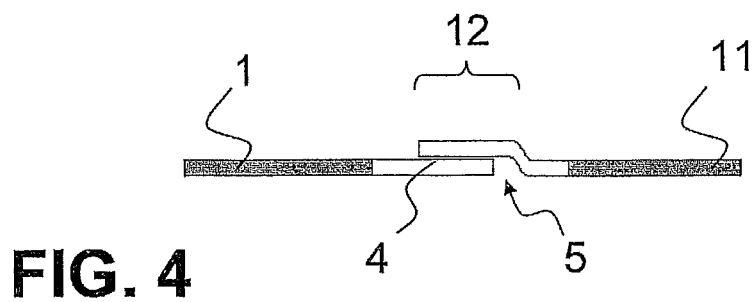

FIG. 4 shows the arrangement of two structural parts in relation to one another, specifically a first structural part 1 and a second structural part 11. The two structural parts have second surface portions 7 (shown here colored white for emphasis), which are still formable and are not cured. The structural parts are arranged partially one on top of the other such as to form an overlapping region 12 with the still uncured composite material. With respect to the second structural part 11 shown on the right, the shape 5 is likewise changed.

Figure 5:
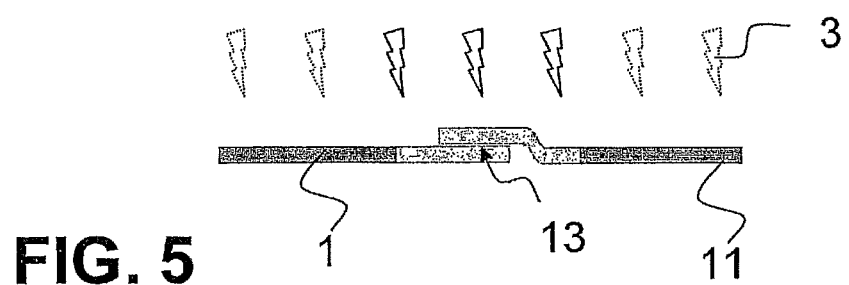

The arrangement of the first structural part and of the second structural part 11 which is prepared in this way is treated with microwaves 3, it also being possible for this to take place, if appropriate, in a targeted manner, as shown in FIG. 5 by the microwaves 3 indicated only by dashed lines on the outside. A direct integral bond 13 is formed here in the overlapping region 12.

Figure 6:
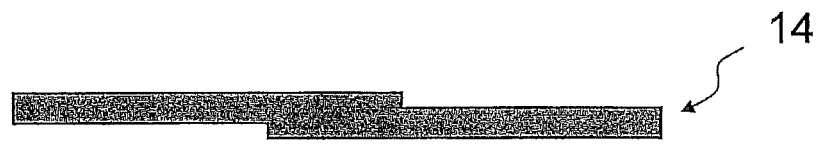

The ultimate result is the production of a component 14 having the same material properties over the entire cross section, as shown in FIG. 6 by the uniform coloration.

The invention claimed is:

1. A method for producing a structural part having at least one layer comprising fiber-reinforced composite material that is a pre-preg material including fibers and a polymer matrix surrounding and encompassing the fibers, the polymer matrix absorbing microwaves for curing, said method comprising at least the following steps:
    a) arranging the at least one layer in a shape; and
    b) treating a first surface portion of the at least one layer with microwaves, wherein a temperature limiting mechanism of the at least one layer interacts at least temporarily with at least one adjacent second surface portion, thereby only partially curing the polymer matrix in the first surface region during treatment of the first surface portion with microwaves.

2. The method as claimed in patent claim 1, in which, in step b), at least one heat-dissipating element is brought into contact with the second surface portion as the temperature limiting mechanism.

3. The method as claimed in patent claim 1, in which, in step b), at least one cooling fluid is brought into contact with the second surface portion as the temperature limiting mechanism.

4. The method as claimed in patent claim 1, in which, in step b), at least one microwave shield is positioned on the second surface portion as the temperature limiting mechanism.

5. The method as claimed in patent claim 1, in which steps a) and b) are carried out for a plurality of structural parts and the structural parts are further treated according to at least the following steps:
   c) positioning a plurality of structural parts with respect to one another in such a manner that in each case second surface portions at least partially form at least one overlapping region, and
   d) treating the at least one overlapping region with microwaves.

6. The method as claimed in patent claim 5, in which at least one of the structural parts is deformed in the region of the second surface portion at least between steps b) and c) or during step c).

7. The method as claimed in patent claim 5, in which, in step d), a direct integral bond of the plurality of structural parts is formed in the overlapping region.

8. The method as claimed in patent claim 1, wherein, treating the first surface portion of the at least one layer with microwaves, as in step b), comprises curing the first surface portion.

9. The method as claimed in patent claim 8, wherein curing the first surface portion comprises cross-linking the first surface portion to a greater extent than the second surface portion.

10. The method as claimed in patent claim 5, wherein, treating the first surface portion of the at least one layer with microwaves, as in step b), comprises curing the first surface portion and wherein, treating the at least one overlapping region with microwaves comprises curing the at least one overlapping region.

11. The method as claimed in patent claim 10, wherein curing the first surface portion comprises cross-linking the first surface portion to a greater extent than the second surface portion and wherein curing the at least one overlapping region comprises increasing an extent of cross-linking in the at least one overlapping region.

12. The method as claimed in patent claim 1, wherein the pre-preg material is a pre-impregnated fabric which is soaked in synthetic resins and is thermally treated until it has only slightly solidified, such that the pre-impregnated fabric is handleable in layers.

13. The method as claimed in patent claim 1, wherein the microwaves penetrate into the composite material to such an extent that the degrees of cross-linking are substantially equal over the entire thickness of the structural part.

* * * * *